(12) United States Patent
Tay

(10) Patent No.: US 7,015,960 B2
(45) Date of Patent: Mar. 21, 2006

(54) IMAGE SENSOR THAT USES A TEMPERATURE SENSOR TO COMPENSATE FOR DARK CURRENT

(75) Inventor: Hiok Nam Tay, Irvine, CA (US)

(73) Assignee: Candela Microsystems, Inc., Irvine, CA (US)

( * ) Notice: Subject to any disclaimer, the term of this patent is extended or adjusted under 35 U.S.C. 154(b) by 206 days.

(21) Appl. No.: 10/445,143

(22) Filed: May 23, 2003

(65) Prior Publication Data

US 2004/0183928 A1 Sep. 23, 2004

Related U.S. Application Data

(60) Provisional application No. 60/455,631, filed on Mar. 18, 2003.

(51) Int. Cl.
*H04N 5/225* (2006.01)
*H04N 9/64* (2006.01)

(52) U.S. Cl. .......................... 348/244; 348/250
(58) Field of Classification Search ................ 348/243, 348/244, 343
See application file for complete search history.

(56) References Cited

U.S. PATENT DOCUMENTS

| | | | |
|---|---|---|---|
| 4,425,501 A | 1/1984 | Stauffer | |
| 4,473,836 A | 9/1984 | Chamberlain | |
| 4,614,966 A | 9/1986 | Yunoki et al. | |
| 4,647,975 A | 3/1987 | Alston et al. | |
| 4,703,442 A | 10/1987 | Levine | |
| 4,704,633 A | 11/1987 | Matsumoto | |
| 4,760,453 A * | 7/1988 | Hieda ......................... | 348/243 |
| 4,858,013 A | 8/1989 | Matsuda | |
| 4,974,093 A | 11/1990 | Murayama et al. | |
| 5,043,821 A | 8/1991 | Suga et al. | |
| 5,047,861 A * | 9/1991 | Houchin et al. ............ | 348/247 |
| 5,113,246 A | 5/1992 | Ninomiya et al. | |
| 5,138,458 A | 8/1992 | Nagasaki et al. | |
| 5,159,457 A | 10/1992 | Kawabata | |
| 5,162,914 A | 11/1992 | Takahashi et al. | |
| 5,235,197 A | 8/1993 | Chamberlain et al. | |
| 5,278,658 A | 1/1994 | Takase | |
| 5,309,243 A | 5/1994 | Tsai | |
| 5,420,635 A | 5/1995 | Konishi et al. | |
| 5,434,620 A | 7/1995 | Higuchi et al. | |

(Continued)

OTHER PUBLICATIONS

Sunetra K. Mendis, Sabrina E. Kemeny and Eric R. Fossum, A 128×128 CMOS Active Pixel Image Sensor for Highly Integrated Imaging Systems, 1993 IEEE, IEDM 93-583-586, 0-7803-1450-6.

(Continued)

*Primary Examiner*—Ngoc-Yen Vu
*Assistant Examiner*—James M. Hannett
(74) *Attorney, Agent, or Firm*—Ben J. Yorks, Esq.; Irell & Manella LLP

(57) ABSTRACT

An image sensor that has a temperature sensor. The temperature sensor senses the temperature of a pixel array of the image sensor. The sensed temperature is used to scale a dark frame image generated by the pixel array. The scaled dark frame image is subtracted from a light image frame generated by the pixel array. The scaled dark image frame compensates for temperature variations in the pixel array. The scaled dark image frame may be generated by multiplying the dark frame by a scale factor(s). The scale factor may be computed from an equation or determined from a look-up table. The equation or look-up table may compensate for thermal gradients across the pixel.

12 Claims, 3 Drawing Sheets

U.S. PATENT DOCUMENTS

| | | | |
|---|---|---|---|
| 5,436,662 A | 7/1995 | Nagasaki et al. | |
| 5,455,621 A | 10/1995 | Morimura | |
| 5,461,425 A | 10/1995 | Fowler et al. | |
| 5,471,515 A | 11/1995 | Fossum et al. | |
| 5,508,740 A * | 4/1996 | Miyaguchi et al. | 348/244 |
| 5,587,738 A | 12/1996 | Shinohara | |
| 5,638,118 A | 6/1997 | Takahashi et al. | |
| 5,665,959 A | 9/1997 | Fossum et al. | |
| 5,675,381 A | 10/1997 | Hieda et al. | |
| 5,729,288 A * | 3/1998 | Saito | 348/243 |
| 5,737,016 A | 4/1998 | Ohzu et al. | |
| 5,801,773 A | 9/1998 | Ikeda | |
| 5,841,126 A | 11/1998 | Fossum et al. | |
| 5,861,620 A | 1/1999 | Takahashi et al. | |
| 5,880,460 A | 3/1999 | Merrill | |
| 5,883,830 A | 3/1999 | Hirt et al. | |
| 5,886,659 A | 3/1999 | Pain et al. | |
| 5,892,541 A | 4/1999 | Merrill | |
| 5,909,026 A | 6/1999 | Zhou et al. | |
| 5,926,214 A | 7/1999 | Denyer et al. | |
| 5,929,908 A | 7/1999 | Takahashi et al. | |
| 5,953,061 A | 9/1999 | Biegelsen et al. | |
| 5,962,844 A | 10/1999 | Merrill et al. | |
| 5,990,506 A | 11/1999 | Fossum et al. | |
| 6,005,619 A | 12/1999 | Fossum | |
| 6,008,486 A | 12/1999 | Stam et al. | |
| 6,021,172 A | 2/2000 | Fossum et al. | |
| 6,040,858 A | 3/2000 | Ikeda | |
| 6,049,357 A | 4/2000 | Shinohara | |
| 6,101,287 A | 8/2000 | Corum et al. | |
| 6,115,065 A | 9/2000 | Yadid-Pecht et al. | |
| 6,115,066 A | 9/2000 | Gowda et al. | |
| 6,144,408 A | 11/2000 | MacLean | |
| 6,204,881 B1 | 3/2001 | Ikeda et al. | |
| 6,246,436 B1 | 6/2001 | Lin et al. | |
| 6,249,647 B1 * | 6/2001 | Cazier et al. | 396/97 |
| 6,300,978 B1 | 10/2001 | Matsunaga et al. | |
| 6,317,154 B1 | 11/2001 | Beiley | |
| 6,369,737 B1 | 4/2002 | Yang et al. | |
| 6,418,245 B1 | 7/2002 | Udagawa | |
| 6,493,030 B1 | 12/2002 | Kozlowski et al. | |
| 6,532,040 B1 | 3/2003 | Kozlowski et al. | |
| 6,538,593 B1 | 3/2003 | Yang et al. | |
| 6,630,955 B1 | 10/2003 | Takada | |
| 6,747,696 B1 | 6/2004 | Nakata et al. | |
| 6,798,456 B1 * | 9/2004 | Sato | 348/362 |
| 2001/0040631 A1 | 11/2001 | Ewedemi et al. | |
| 2003/0128285 A1 * | 7/2003 | Itoh | 348/246 |
| 2003/0214590 A1 * | 11/2003 | Matherson | 348/243 |
| 2004/0051797 A1 * | 3/2004 | Kelly et al. | 348/244 |
| 2004/0085072 A1 | 5/2004 | Kanou et al. | |

OTHER PUBLICATIONS

E.S. EID, A.G. Dickinson, D.A. Inglis, B.D. Ackland and E.R. Fossum, A 256×256 CMOS Active Pixel Image Sensor, SPIE vol. 2415/265-275, 0-8194-1762-9/95.

S. Anderson, W. H. Bruce, P. B. Denyer, D. Renshaw and G. Wang, A Single Chip Sensor & Image Processor for Fingerprint Verification, IEEE 1991 Custom Integrated Circuits Conference, CH2994-2/91/0000/0061.

Eric R. Fossum, Active Pixel Sensors: Are CCD's Dinosaurs?, SPIE vol. 1900/2-14, 0-8194-1133-7/93.

D. Renshaw, P. B. Denyer, G. Wang and M. Lu, ASIC Image Sensors, IEEE 1990, CH2868-8/90/0000-3038-3041.

D. Renshaw, P. B. Denyer, G. Wang and M. Lu, ASIC Vision, IEEE 1990 Custom Integrated Circuits Conference, CH2860-5/90/0000-0022.

Jaroslav Hynecek, BCMD—An Improved Photosite Structure for High-Density Image Sensors, IEEE Transactions on Electron Devices, vol. 38, No. 5, May 1991, 0018-9383/91/0500-1011-1020.

P. B. Denyer, D. Renshaw, Wang Guoyu and Lu Mingying, CMOS Image Sensors for Multimedia Applications, IEEE 1993 Custom Integrated Circuits Conference, 0-7803-0826-3/93.

Eric R. Fossum, CMOS Image Sensors: Electronic Camera on A Chip, IEEE International Electron Devices Meeting Technical Digest, Dec. 10-13, 1995, Washington D.C.

G. Wang, D. Renshaw, P. B. Denyer and M. Lu, CMOS Video Cameras, 1991 IEEE, TH0367-3/91/0000/0100-103.

A. S. Grove, Physics and Technology of Semiconductor Devices, Section 6.6 Current-Voltage Characteristics, 172-191.

Fernand Van De Wiele, Photodiode Quantum Efficiency, Solid State Imaging, 47-90.

Alex Dickinson, Bryan Ackland, El-Sayed Eid, David Inglis, and Eric R. Fossum, Standard CMOS Active Pixel Image Sensors for Multimedia Applications, 1995 IEEE, 0-8186-7047-9/95, 214-225.

Eric R. Fossum, Ultra Low Power Imaging Systems Using CMOS Image Sensor Technology, Proceedings of the SPIE, vol. 2267, Advanced Microdevices and Space Science Sensors (1994).

Orly Yadid-Pecht, Christopher Clark, Bedabrata Pain, Craig Staller, and Eric Fossum, Wide dynamic range APS star tracker, SPIE vol. 2654/82-92, 0-8194-2028-X.

* cited by examiner

IMAGE SENSOR THAT USES A TEMPERATURE SENSOR TO COMPENSATE FOR DARK CURRENT

REFERENCE TO CROSS RELATED APPLICATION

This application claims priority under 35 U.S.C §119(e) to provisional application No. 60/455,631, filed on Mar. 18, 2003.

BACKGROUND OF THE INVENTION

1. Field of the Invention

The subject matter disclosed generally relates to the field of semiconductor image sensors.

2. Background Information

Photographic equipment such as digital cameras and digital camcorders may contain electronic image sensors that capture light for processing into a still or video image, respectively. There are two primary types of electronic image sensors, charge coupled devices (CCDs) and complimentary metal oxide semiconductor (CMOS) sensors. CCD image sensors have relatively high signal to noise ratios (SNR) that provide quality images. Additionally, CCDs can be fabricated to have pixel arrays that are relatively small while conforming with most camera and video resolution requirements. A pixel is the smallest discrete element of an image. For these reasons, CCDs are used in most commercially available cameras and camcorders.

CMOS sensors are faster and consume less power than CCD devices. Additionally, CMOS fabrication processes are used to make many types of integrated circuits. Consequently, there is a greater abundance of manufacturing capacity for CMOS sensors than CCD sensors.

Both CCD and CMOS image sensors may generate inaccurate image data because of dark current in the pixel and a variation of the dark current from pixel to pixel. Each pixel of an image sensor pixel array provides an output voltage that varies as a function of the light incident on the pixel. Unfortunately, dark currents add to the output voltages. The dark current and its variation from pixel to pixel degrade the picture provided by the image system.

Dark current varies from one pixel to another, thus making it impossible to use a single dark current estimate for the entire pixel array to subtract from all the output voltage values. Dark current also tends to have an exponential dependence on temperature such that its magnitude doubles for every 8 degrees Kelvin. Consequently, a single dark frame captured at a different temperature than the light frame (the actual picture frame) does not accurately represent the dark signals embedded in the light frame and require some sort of scaling. Furthermore, it is common to have temperature variations across the substrate leading to different average dark current at different locations of the pixel array. Additionally, if the temperature of the ambience changes, different locations of the pixels array may have different changes of temperatures, thus leading to different change ratios of dark current at different locations. All these factors make it difficult to use estimate dark signals accurately across the pixel array using a one-time captured dark frame that is scaled and subtracted from the light frames.

There have been efforts to compensate for the dark currents of the pixel array. U.S. Pat. No. 5,926,214 issued to Denyer et al. discloses a dark current compensation scheme where a dark frame is taken contemporaneously with a light frame. Both the dark frame and the light frame are captured at the same temperature. The dark frame is subtracted from the light frame to substantially remove dark signals from the output of the sensor. Unfortunately, such dark frame approaches require the closing of a camera shutter or some other means to prevent light from impinging upon the sensor. Closing the camera shutter contemporaneously with each picture increases the shot-to-shot delay of the camera.

U.S. Pat. No. 6,101,287 issued to Corum, et al. and U.S. Pat. No. 5,278,658 issued to Takase each disclose a scheme where a single dark frame is captured and certain "dark" pixels of the array are used to generate a dark signal reference for scaling the dark frame. The dark pixels are optically shielded from the ambient light. The dark frame is scaled with a ratio of the average dark signal of the dark pixels in the light frame, to the dark frame. Unfortunately, some light still strikes the dark pixels so that the dark pixel outputs are not truly representative of the dark signals. Additionally, the dark signals of interior pixels scale differently than the peripheral dark pixels.

U.S. Pat. No. 6,144,408 issued to MacLean discloses a scheme that does not rely on periphery dark pixels and can generate multiple scaling factors for interiors of the pixel array. In this scheme, certain pixels where dark currents are founded to be strongest are selected and organized into groups. An average Laplacian is calculated for the dark frame for each group. Laplacian basically measures the amount of "spiking" of voltage value at the pixel relative to its neighbors. Subsequently, in the light frame average Laplacian is calculated for each group again. The ratio of average Laplacian in the light frame to that in the dark frame becomes the scaling factors across the entire pixel array from those groups of selected pixels. This technique is relatively inadequate because picture details at the vicinity of those selected pixels interfere with the accuracy of the scaling factor calculation.

There is therefore a need to use a single dark frame to estimate and subtract dark signals for an entire pixel array despite changes in ambient temperature and variations of temperature across the pixel array.

BRIEF SUMMARY OF THE INVENTION

An image sensor with a temperature sensor that can sense the temperature of a pixel array.

DETAILED DESCRIPTION

Disclosed is an image sensor that has a temperature sensor. The temperature sensor senses the temperature of a pixel array of the image sensor. The sensed temperature is used to scale a dark frame image generated by the pixel array. The scaled dark frame image is subtracted from a light image frame generated by the pixel array. The scaled dark image frame compensates for temperature variations in the pixel array. The scaled dark image frame may be generated by multiplying the dark frame by a scale factor(s). The scale factor may be computed from an equation or determined from a look-up table. The equation or look-up table may compensate for thermal gradients across the pixel.

The entire image sensor is preferably constructed with CMOS fabrication processes and circuits. Although a CMOS image sensor is described, it is to be understood that the temperature compensation schemes disclosed herein may be implemented in other types of image sensors such as CCD sensors.

Figure 1:
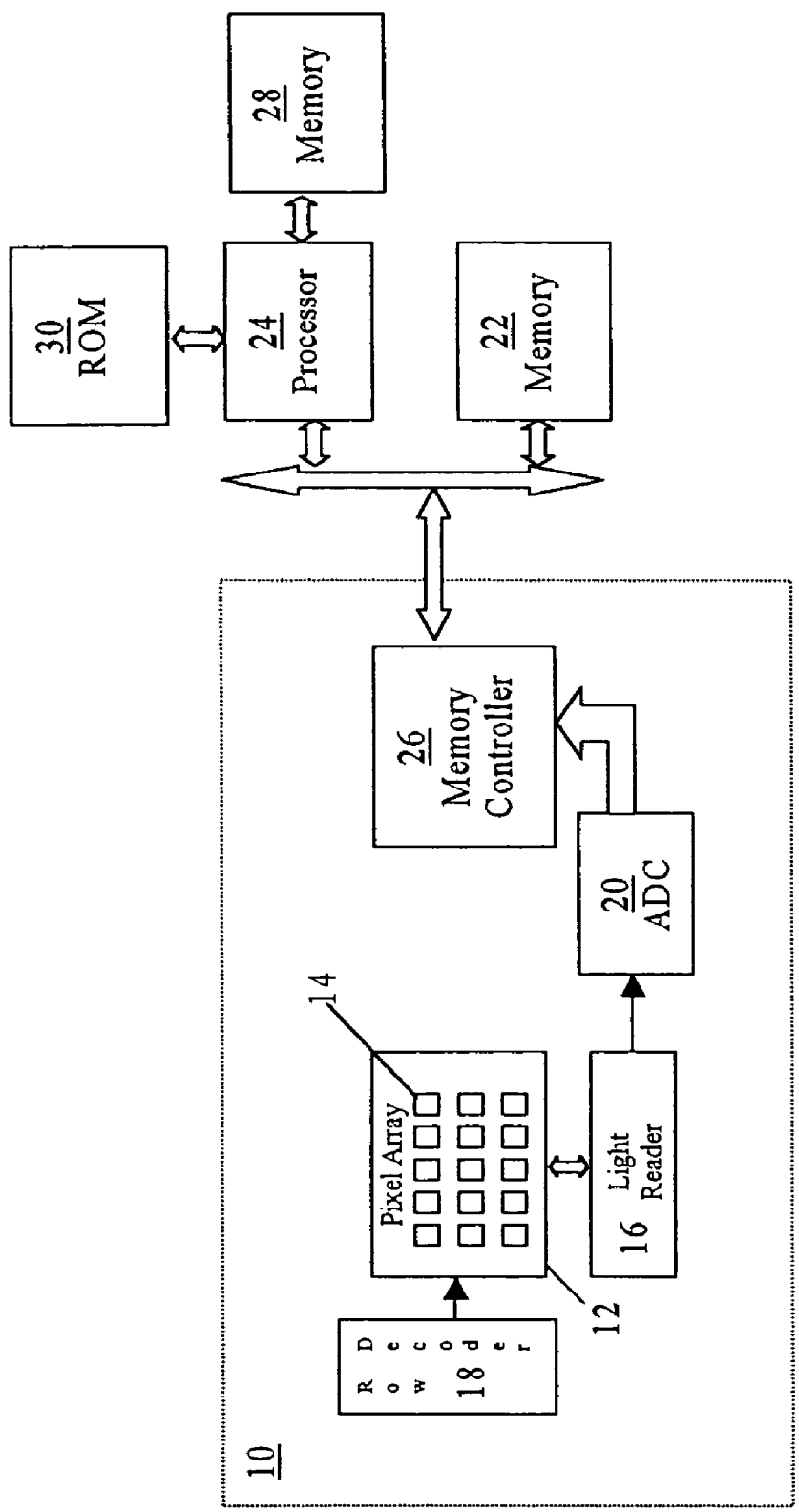
FIG. 1 is a schematic of an embodiment of an image sensor.

Referring to the drawings more particularly by reference numbers, FIG. 1 shows an image sensor 10. The image sensor 10 includes a pixel array 12 that contains a plurality of individual photodetecting pixels 14. The pixels 14 are arranged in a two-dimensional array of rows and columns.

The pixel array 12 is coupled to a light reader circuit 16 and a row decoder 18. The row decoder 18 can select an individual row of the pixel array 12. The light reader 16 can then read specific discrete columns within the selected row. Together, the row decoder 18 and light reader 16 allow for the reading of an individual pixel 14 in the array 12.

The light reader 16 may be coupled to an analog to digital converter 20 (ADC). The ADC 20 generates a digital bit string that corresponds to the amplitude of the signal provided by the light reader 16 and the selected pixels. The digital data may be stored in an external memory 22.

The digital bit strings can be transferred to an external processor 24 and memory 22 by a memory controller 26. The processor 24 may be coupled to another external memory device 28. The external memory 28 may store dark frame information that is used by the processor 24. The processor 24 may operate in accordance with firmware embedded in a non-volatile memory device 30 such as a read only memory ("ROM"). By way of example, the sensor 10, processor 24, and memory 28 and 30 may be integrated into photographic instruments such as a digital camera, a digital camcorder, or a cellular phone unit that contains a camera.

The image sensor 10, processor 24, and memory 28 and 30 may be configured, structured and operated in the same, or similar to, the corresponding image sensors and image sensor systems disclosed in application Ser. Nos. 10/183, 218, 10/236,515 and 10/383,450, which are hereby incorporated by reference.

Figure 2:
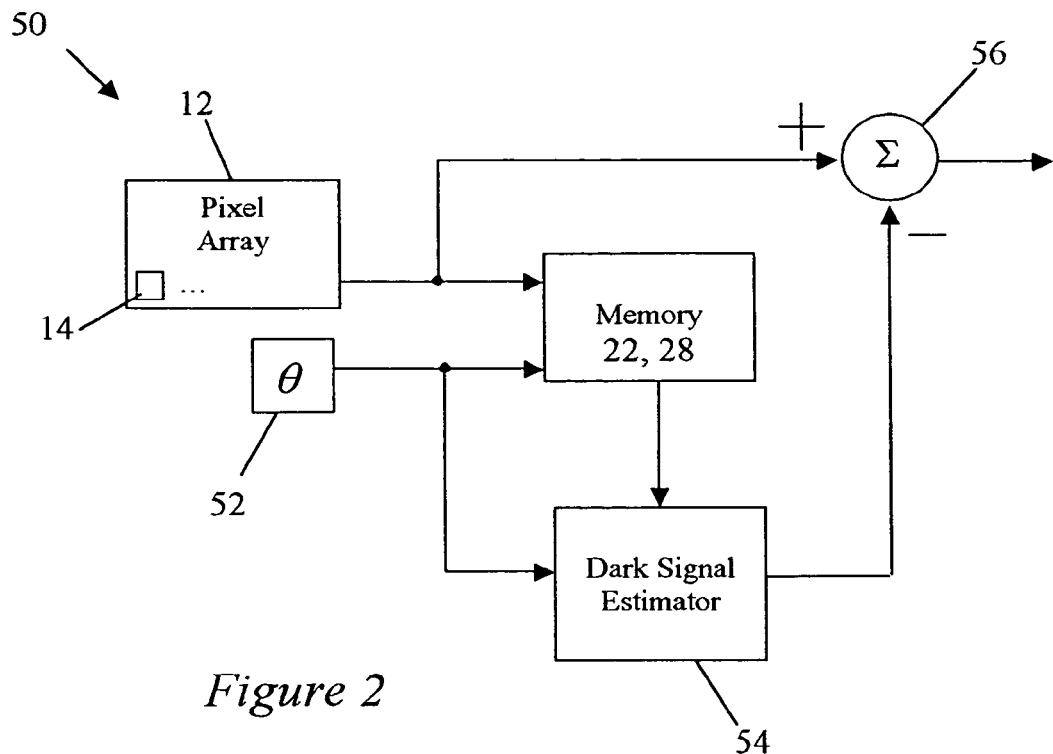
FIG. 2 is a schematic of a dark signal reduction circuit of the image sensor.

FIG. 2 shows a schematic of a dark signal reduction circuit 50. The circuit 50 includes a temperature sensor 52 that senses the temperature of the pixel array 12. The temperature sensor 52 is coupled to a dark frame estimator 54 that can scale a dark image frame generated by the pixel array 12. The dark image frame can be stored in memory that is coupled to the estimator 54. The memory may be either the memory 22 of the sensor 10 or the external memory device 28.

The dark frame estimator 54 may be coupled to a combiner 56 that is also connected to the pixel array 12. The combiner 56 may be an adder that subtracts a scaled dark image frame created by the estimator 54 from a light image frame generated by the pixel array. The dark frame estimator 54 and/or combiner 56 may be either on the sensor 10, or the processor 24, or both. If located in the external processor 24 the functions of the estimator 54 and combiner 56 may actually be performed by instructions executed by the processor 30. If on the sensor 10, the estimator 54 and combiner 56 may be dedicated circuits.

The dark frame estimator 54 may scale the dark image frame by multiplying the dark frame by a scale factor. The dark image frame is generated when no light impinges the pixel array 12. The dark image frame is composed of individual output voltage values for each pixel 14 of the array 12. The exposure time and the temperature of the pixel array 12 for the dark image frame may be stored in memory 22, 28.

The scale factor for the scaled dark image frame may be computed in accordance with the following equation:

$$S = \exp[(T-T_0)/(A)] \ast (t/t_0) \qquad (1)$$

where;
S=the scale factor.
A=a temperature constant.
T=temperature provided by the temperature sensor at the time of the light image frame exposure.
$T_0$=temperature provided by the temperature sensor at the time of the dark image frame exposure.
t=exposure time of the light image frame.
$t_0$=exposure time of the dark image frame.

Alternatively, the scale factor may be determined from a look-up table that provides a different scale factor for each sensed temperature.

The estimator 54 may utilize an equation(s) or a look-up table that compensates for a temperature gradient across the pixel array 12. The output values of each pixel 14 in the pixel array 12 may be separately scaled with a factor calculated by the equation(s) or determined from the look-up table. By way of example, the scale factor for a particular pixel may be computed with the following equations:

$$K(x,y) = a + b \ast x + c \ast y + d \ast x^2 + e \ast y^2 + f \ast x \ast y \qquad (2)$$

$$T' - T'_0 = K \ast (T - T_0) \qquad (3)$$

$$S = \exp[(T' - T'_0)/(A)] \ast (t/t_0)$$

Or $$S = \exp[K \ast (T - T_0)/(A)] \ast (t/t_0) \qquad (4)$$

Where;
K=scale factor of a pixel located a location x, y of the pixel array.
a–f=predetermined coefficients that may be dependent on temperature, these coefficients may be provided by a look-up table that contains temperature as a parameter.
x=the x location of the pixel in the pixel array.
y=the y location of the pixel in the pixel array.
T'=the temperature of the pixel at location x,y at the light image frame exposure.
$T'_0$=the temperature of the pixel at location x,y at the time of the dark frame exposure.

The coefficients of the polynomial equation may be empirically determined for each particular image sensor layout. The computations of the equations (1),(2), (3) and (4) can be performed by instructions operated by the processor 24 and provided by firmware embedded in non-volatile memory 30.

Figure 3:
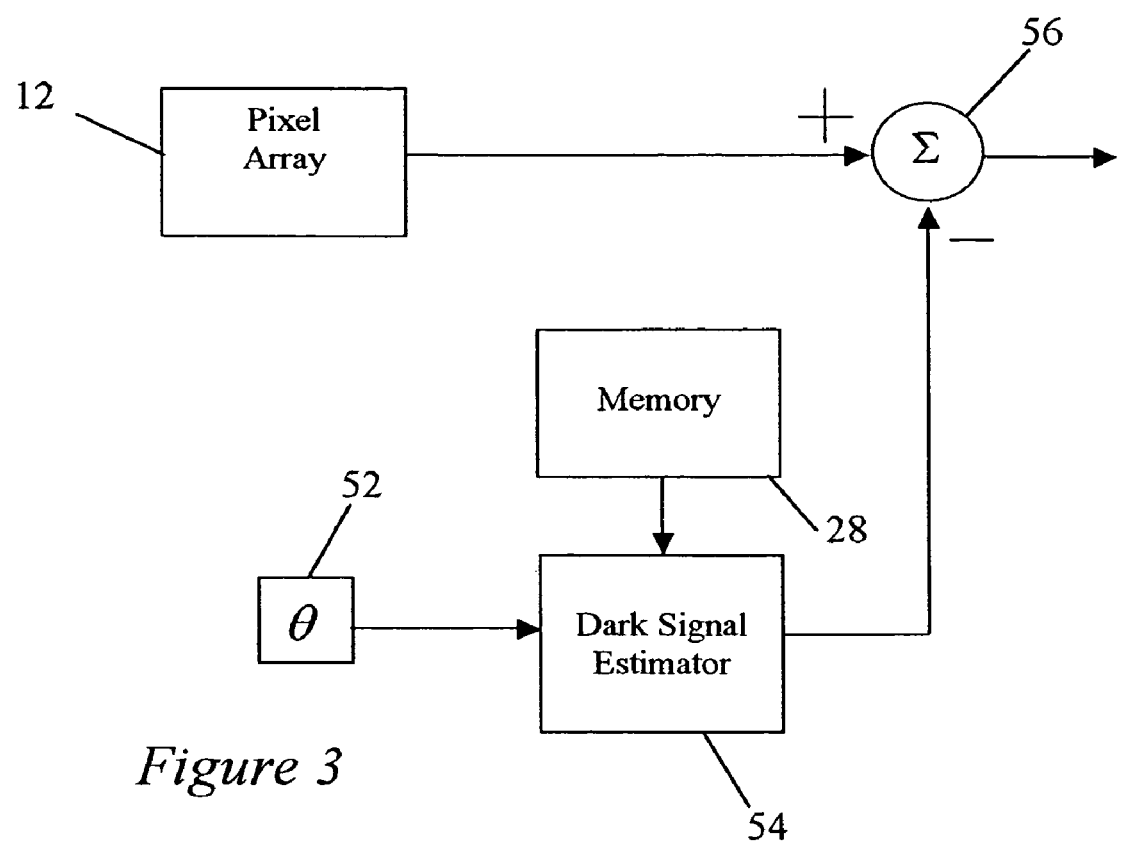
FIG. 3 is a schematic of an alternate embodiment of the dark signal reduction circuit.

In operation, the image sensor 10 may be calibrated by initially generating a dark image frame with no light impinging on the pixel array 12. The pixel array 12 may be darkened by closing the shutter or otherwise preventing light from impinging the array 12. The output voltage values of each pixel 14 are stored in memory 22, 28. The temperature and time exposure values for the dark frame may also be stored in memory 22, 28. The dark frame calibration may be performed each time the camera is powered on. Alternatively, the dark image frame calibration may be performed during the manufacturing process. FIG. 3 shows an embodiment when the calibration is performed at a manufacturing facility. The dark image frame, temperature and exposure time can all be read by an external tester (machine) and then stored in memory 28. By way of example, the memory 28 may be a SDRAM, EEPROM or flash memory.

When a picture is taken the pixel array 12 generates a light image frame. The temperature sensor 52 provides a temperature value to the estimator 54. The estimator 54 either computes, or determines, a scale factor(s) from the sensed temperature of the array 12. The estimator 54 then multiplies the scale factor with each output voltage value of the dark image frame stored in memory 22, 28 to create a scaled dark image frame.

The combiner 56 subtracts the scaled dark image frame from the light image frame to compensate for dark signal variations in the pixel array 12. Providing a temperature sensor 52 to directly sense the temperature of the pixel array 12 more accurately compensates for temperature variations without relying on contemporaneous mechanical shutters or shielded pixels to generate the scaled dark image.

Figure 4:
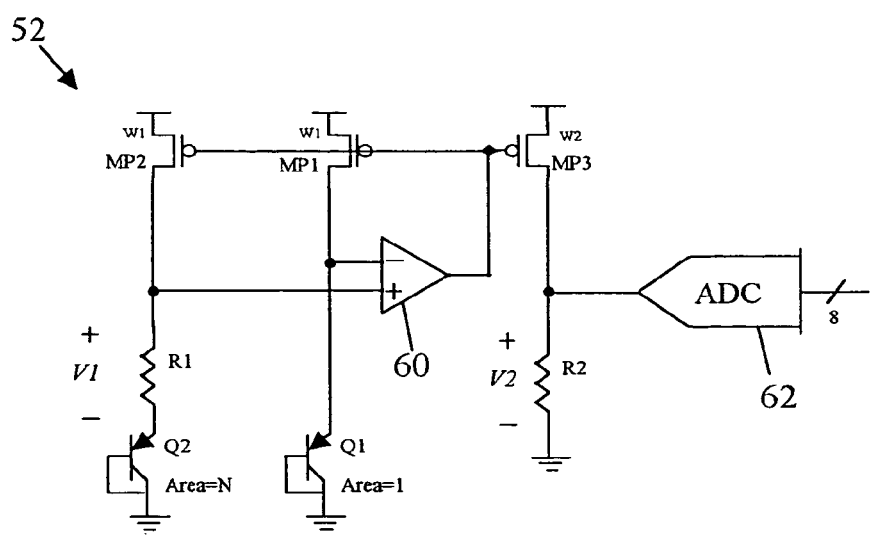
FIG. 4 is a schematic of an embodiment of a temperature sensor.

FIG. 4 shows an embodiment of a temperature sensor 52. The sensor 52 includes a pair of bi-polar ("BJT") transistor Q1 and Q2 coupled to current source field effect ("FET") transistors MP1, MP2 and MP3. FETs MP1 and MP2 have the same channel widths W1. FET MP3 has a channel width of W2. An amplifier 60 has inputs coupled to the BJT transistors Q1 and Q2 and an output connected to the gate of FET MP3.

BJTs Q1 and Q2 have different emitter widths defined by the ratio N. The amplifier 60 senses a differential voltage between Q1 and Q2 across resistor R1. The voltage V1 across the resistor R1 will vary with temperature as defined by the equation:

$$V1 = K*T*\ln(N) \quad (3)$$

where;
V1=voltage across resistor V1.
K=Boltzmann's constant.
T=temperature provided by the sensor.
N=ratio of Q1 and Q2 emitter widths.

The temperature sensor 52 may include an analog to digital converter 62 that converts the voltage V2 across resistor R2 into a digital bit string. The voltage V2 across the resistor R2 is defined by the following temperature dependent equation:

$$V2 = K \cdot T \cdot \ln(N) \cdot (R_1/R_2) \, (W2/W2) \quad (4)$$

It is the intention of the inventor that only claims which contain the term "means" shall be construed under 35 U.S.C. §112, sixth paragraph.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. An image sensor system, comprising:
   a pixel array that has a plurality of pixels;
   a temperature sensor that senses a temperature of said pixel array;
   a memory;
   a dark frame estimator coupled to said memory and said temperature sensor, said dark frame estimator multiplies a dark image frame with a scale factor to create a scaled dark image frame, said scale factor is computed from at least one polynomial equation that provides a different scale factor for at least two different pixels of said pixel array; and,
   a combiner coupled to said dark signal estimator and said pixel array, said combiner combines the scaled dark image frame with a light image frame generated by said pixel array.

2. The image sensor system of claim 1, wherein said pixel array and said temperature sensor are located on an integrated circuit.

3. The image sensor system of claim 1, wherein said memory is coupled to said pixel array.

4. The image sensor system of claim 1, wherein said memory is coupled to said temperature sensor.

5. The image sensor system of claim 1, wherein the polynomial equation is dependent on temperature and exposure time.

6. An image sensor system, comprising:
   pixel array means for generating a dark image frame and a light image frame;
   temperature sensor means for sensing a temperature of said pixel array means during the generation of the light image frame;
   memory means for storing the dark image frame;
   dark frame estimator means for multiplying the dark image frame with a scale factor computed from at least one polynomial equation that provides a different scale factor for at least two different pixels of said pixel array means; and,
   combiner means for combining the scaled dark image frame with the light image frame.

7. The image sensor system of claim 6, wherein said pixel array means and said temperature sensor means are located on an integrated circuit.

8. The image sensor system of claim 6, wherein said memory means stores at least one coefficient.

9. The image sensor system of claim 6, wherein the polynomial equation is dependent on temperature and exposure time.

10. A method for dark signal reduction in an image sensor, comprising:
    sensing a temperature of a pixel array that generates a light image frame;
    scaling a dark image frame in accordance with the sensed temperature, wherein the dark image frame is scaled by multiplying the dark image frame with a scale factor to create a scaled dark image frame, wherein the scale factor is computed from at least one polynomial equation that provides a different scale factor for at least two different pixels of the pixel array; and,
    combining the scaled dark image frame with the light image frame.

11. A program storage medium that can cause a processor to provide dark signal reduction in an image sensor system, comprising:
    a processor readable storage medium that causes a processor of an image sensor system to scale a dark image frame based on a temperature of a pixel array sensed during the generation of a light image frame to create a scaled dark image frame, wherein the dark image frame is scaled by multiplying the dark image frame with a scale factor computed from at least one polynomial equation that provides a different scale factor for at least two different pixels of said pixel array, and combining the scaled dark image frame with the light image frame.

12. The storage medium of claim 11, wherein the polynomial equation is dependent on temperature and exposure time.

* * * * *